US012040558B1

(12) United States Patent
Lialios et al.

(10) Patent No.: US 12,040,558 B1
(45) Date of Patent: Jul. 16, 2024

(54) ULTRAWIDEBAND BEAMFORMING NETWORKS

(71) Applicants: Dimitrios Lialios, Miami, FL (US); Constantinos Zekios, Miami, FL (US); Stavros Georgakopoulos, Miami, FL (US)

(72) Inventors: Dimitrios Lialios, Miami, FL (US); Constantinos Zekios, Miami, FL (US); Stavros Georgakopoulos, Miami, FL (US)

(73) Assignee: THE FLORIDA INTERNATIONAL UNIVERSITY BOARD OF TRUSTEES, Miami, FL (US)

( * ) Notice: Subject to any disclaimer, the term of this patent is extended or adjusted under 35 U.S.C. 154(b) by 0 days.

(21) Appl. No.: 18/328,382

(22) Filed: Jun. 2, 2023

(51) Int. Cl.

| | |
|---|---|
| ***H01Q 3/40*** | (2006.01) |
| ***H01Q 3/26*** | (2006.01) |
| ***H01Q 3/30*** | (2006.01) |
| ***H01Q 3/34*** | (2006.01) |
| ***H01Q 21/00*** | (2006.01) |
| ***H01Q 21/06*** | (2006.01) |

(52) U.S. Cl.
CPC ................ *H01Q 3/40* (2013.01); *H01Q 3/26* (2013.01); *H01Q 3/2682* (2013.01); *H01Q 3/30* (2013.01); *H01Q 3/34* (2013.01); *H01Q 21/0006* (2013.01); *H01Q 21/0025* (2013.01); *H01Q 21/061* (2013.01); *H01Q 21/065* (2013.01)

(58) Field of Classification Search
CPC ........................................................ H01Q 3/46
See application file for complete search history.

(56) References Cited

U.S. PATENT DOCUMENTS 3,518,695 A * 6/1970 Schroeder .............. H01Q 21/08 342/368
3,618,097 A * 11/1971 McLeod, Jr. ............ H01Q 3/22 342/373
4,101,902 A * 7/1978 Trigon ................... H01Q 25/00 343/757
4,191,960 A * 3/1980 Lopez ...................... H01Q 3/34 342/372
4,321,605 A * 3/1982 Lopez ...................... H01Q 3/26 342/368

(Continued)

OTHER PUBLICATIONS

Dimitrios I. Lialios et al., A New Class of 2D Scanning Planar TTD Multibeam Networks, 2023 IEEE International Symposium on Antennas and Propagation and USNC-URSI Radio Science Meeting (AP-S/URSI), Portland, OR, USA, 2023, 2 pages.

(Continued)

*Primary Examiner* — Bernarr E Gregory
(74) *Attorney, Agent, or Firm* — Saliwanchik, Lloyd & Eisenschenk

(57) ABSTRACT

Ultrawideband (UWB) beamforming networks are provided. A UWB beamforming network can have azimuth angle scanning and elevation angle scanning. A modified version of the Blass matrix topology can be used to achieve two-dimensional (2D) scanning behavior. The beamforming network can simultaneously excite a plurality of beams, and each of these beams can be at any chosen frequency inside the bandwidth that the beamformer covers. Each beam can be designed to point at any arbitrary direction, which can be defined by the desired elevation angle and azimuth angle, in the 2D plane.

20 Claims, 27 Drawing Sheets

(56) References Cited

U.S. PATENT DOCUMENTS

| | | | | | |
|---|---|---|---|---|---|
| 4,584,581 | A * | 4/1986 | Teshirogi | H01Q 3/40 | 342/373 |
| 4,673,942 | A * | 6/1987 | Yokoyama | H01Q 25/00 | 342/368 |
| 5,128,687 | A * | 7/1992 | Fay | H01Q 25/008 | 343/754 |
| 5,389,939 | A * | 2/1995 | Tang | H01Q 3/46 | 343/753 |
| 6,104,343 | A * | 8/2000 | Brookner | H01Q 21/061 | 342/372 |
| 2010/0259446 | A1 * | 10/2010 | Corman | H01Q 3/34 | 342/368 |

OTHER PUBLICATIONS

Dimitrios I. Lialios et al., A Planar True Time Delay 2D Beamformer, 2022 IEEE International Symposium on Antennas and Propagation and USNC-URSI Radio Science Meeting (AP-S/URSI), Denver, CO, USA, 2022, pp. 1898-1899, 2 pages.

* cited by examiner

Design parameters of an $8 \times (2 \times 4)$ Blass matrix.

| Beam | $h_i$[ps] | $v_i$[ps] | $(\phi_0,\theta_0)$ [deg] | $m_i$[ps] | $m_i'$[ps] | $r_i'$[ps] | Group |
|---|---|---|---|---|---|---|---|
| 1 | -7.6 | -6.3 | (-140,36) | 23.0 | 18.1 | 16.7 | 1 |
| 2 | -7.6 | 6.3 | (140,36) | 18.1 | 38.3 | 24.4 | 3 |
| 3 | -3.5 | -6.3 | (-119,26) | 27.1 | 18.1 | 20.9 | 2 |
| 4 | -3.5 | 6.3 | (119,26) | 18.1 | 34.1 | 24.4 | 3 |
| 5 | 3.5 | -6.3 | (-61,26) | 34.1 | 18.1 | 27.8 | 4 |
| 6 | 3.5 | 6.3 | (61,26) | 18.1 | 27.1 | 24.4 | 3 |
| 7 | 7.6 | -6.3 | (-40,36) | 38.3 | 18.1 | 32.0 | 5 |
| 8 | 7.6 | 6.3 | (40,36) | 18.1 | 23.0 | 24.4 | 3 |

FIG. 2B

Case 1

| | Beam 1 | Beam 2 | Beam 3 | Beam 4 | Beam 5 | Beam 6 | Beam 7 | Beam 8 |
|---|---|---|---|---|---|---|---|---|
| $(\theta_o,\varphi_o)$ | (-140°,36°) | (140°,36°) | (-119°,26°) | (119°,26°) | (-61°,26°) | (61°,26°) | (-40°,36°) | (40°,36°) |
| $f_o$ in GHz | 24 GHz | 24 GHz | 24 GHz | 24 GHz | 24 GHz | 24 GHz | 24 GHz | 24 GHz |
| BW in GHz | 1 GHz | 1 GHz | 1 GHz | 1 GHz | 1 GHz | 1 GHz | 1 GHz | 1 GHz |

Case 2

| | Beam 1 | Beam 2 | Beam 3 | Beam 4 | Beam 5 | Beam 6 | Beam 7 | Beam 8 |
|---|---|---|---|---|---|---|---|---|
| $(\theta_o,\varphi_o)$ | (-140°,36°) | (140°,36°) | (-119°,26°) | (119°,26°) | (-61°,26°) | (61°,26°) | (-40°,36°) | (40°,36°) |
| $f_o$ in GHz | 24 GHz | 26 GHz | 32 GHz | 38 GHz | 40 GHz | 22 GHz | 35 GHz | 28 GHz |
| BW in GHz | 1 GHz | 1 GHz | 1 GHz | 1 GHz | 1 GHz | 1 GHz | 1 GHz | 1 GHz |

Case 3

| | Beam 1 | Beam 2 | Beam 3 | Beam 4 | Beam 5 | Beam 6 | Beam 7 | Beam 8 |
|---|---|---|---|---|---|---|---|---|
| $(\theta_o,\varphi_o)$ | (-140°,36°) | X | (-119°,26°) | X | (-61°,26°) | (61°,26°) | X | (40°,36°) |
| $f_o$ in GHz | 24 GHz | | 24 GHz | | 24 GHz | 24 GHz | | 24 GHz |
| BW in GHz | 1 GHz | | 1 GHz | | 1 GHz | 1 GHz | | 1 GHz |

Case 4

| | Beam 1 | Beam 2 | Beam 3 | Beam 4 | Beam 5 | Beam 6 | Beam 7 | Beam 8 |
|---|---|---|---|---|---|---|---|---|
| $(\theta_o,\varphi_o)$ | (-140°,36°) | (140°,36°) | (-119°,26°) | (119°,26°) | (-61°,26°) | (61°,26°) | (-40°,36°) | (40°,36°) |
| $f_o$ in GHz | 32 GHz | 32 GHz | 32 GHz | 32 GHz | 32 GHz | 32 GHz | 32 GHz | 32 GHz |
| BW in GHz | 16 GHz | 16 GHz | 16 GHz | 16 GHz | 16 GHz | 16 GHz | 16 GHz | 16 GHz |

FIG. 11

ULTRAWIDEBAND BEAMFORMING NETWORKS

GOVERNMENT SUPPORT

This invention was made with government support under FA9550-21-1-0309 awarded by the Air Force Office of Scientific Research. The government has certain rights in the invention.

BACKGROUND

Millimeter (mm)-Wave frequencies are a critical component of 5G communications, and they have already been introduced in several scientific, military and commercial applications. In the sub-6 gigahertz (GHz) regime digital beamforming is a well-established technology.

However, in the mm-Wave regime, massive antenna arrays are needed to compensate for the increased propagation loss. This demand for high number of antenna elements greatly hinders the viability of digital beamforming because the number of analog-to-digital converters (ADCs) increases proportionally with the number of antennas.

Common implementations use switching matrices combined with a bank of phase shifters behind each antenna element. Nonetheless, their realization at mm-Wave frequencies still presents challenges as they need complex switching and biasing networks. Lens-based beamformers provide a simpler and more cost-effective alternative. However, their size grows disproportionally with the number of beams/antennas. This problem worsens when full dimensional (2D) beamforming is required.

BRIEF SUMMARY

Embodiments of the subject invention provide novel and advantageous ultrawideband (UWB) beamforming networks (e.g., beamforming networks that operate from 24 gigahertz (GHz) to 40 GHz, which corresponds to a 50% fractional bandwidth), as well as methods of fabricating the same and methods of using the same. A UWB beamforming network can have azimuth angle scanning and elevation angle scanning. A modified version of the Blass matrix topology can be used to achieve two-dimensional (2D) scanning behavior. The beamformer can simultaneously excite M number of beams (where M is an integer), and each of these beams can be at any chosen frequency inside the bandwidth ($BW_o$) that the beamformer covers. Each of the M beams can be designed to point at any arbitrary direction (which can be defined by the desired elevation angle ($\theta$) and azimuth angle ($\varphi$)) in the 2D plane, within the capabilities of the antenna array. The beamforming network can provide true-time delay (TTD) performance.

In an embodiment, a UWB beamforming network can comprise a modified Blass matrix topology comprising a plurality of beams, a plurality of transmission lines (TLs), a plurality of intersections of TLs of the plurality of TLs, and a plurality of directional couplers respectively disposed at each intersection of TLs. The UWB beamforming network can have an operational bandwidth (e.g., from 24 GHz to 31 GHz, or 24 GHz to 40 GHz, or any subrange contained therein). Each directional coupler of the plurality of directional couplers can be configured to cover the operational bandwidth of the UWB beamforming network. Each beam of the plurality of beams can be configured to operate at a respective frequency within the operational bandwidth of the UWB beamforming network. Each beam of the plurality of beams can be configured to be directed at any elevation angle and any azimuth angle. The UWB beamforming network can be configured to provide TTD performance. The modified Blass matrix topology can further comprise a plurality of beam ports, a plurality of antenna ports (e.g., configured to connect to antennas of an antenna array connected to the beamforming network), and a plurality of termination ports. The quantity of the termination ports can be greater than the quantity of the beam ports and/or the quantity of the antenna ports (e.g., at least two times the quantity of the beam ports and/or at least two times the quantity of the antenna ports). Each directional coupler of the plurality of directional couplers can be, for example, a dual-layer slot coupler. The UWB beamforming network can have a footprint of, for example, no more than $4.5\lambda_0\times 3.6\lambda_0$ (or less), where $\lambda_0$ is the free space wavelength of the UWB beamforming network at the given the frequency (e.g., 0.0125 meters evaluated at 24 GHz). The UWB beamforming network can be configured such that each beam of the plurality of beams is capable of being at a different frequency from each other beam of the plurality of beams and/or each beam of the plurality of beams is capable of being at the same frequency as each other beam of the plurality of beams. The plurality of beams can comprise, for example, at least eight beams.

In another embodiment, a communications system can comprise an antenna array and a UWB beamforming network connected to the antenna array. The UWB beamforming network can have any or all of the features discussed in the previous paragraph. The antenna array can comprise a plurality of E-shaped patch antennas. Each antenna port of the plurality of antenna ports can be connected to an antenna of the antenna array.

BRIEF DESCRIPTION OF DRAWINGS

FIG. 2B shows a table of design parameters that can be used with the modified Blass matrix shown in FIG. 2A.

In FIG. 3, B1-B8 denote the eight beam ports of the network, A1-A8 denote the eight antenna ports of the network, and T1-T16 denote the 16 ports that need to be terminated.

FIGS. 6A-6D show group delay response for beams 1-4, respectively. In FIG. 6A, from highest group delay value at a frequency of 28 GHz to lowest group delay value at a frequency of 28 GHz are for antenna 3, antenna 4, antenna 2, and antenna 1; in FIG. 6B, from highest group delay value at a frequency of 30 GHz to lowest group delay value at a frequency of 30 GHz are for antenna 2, antenna 1, antenna 4, and antenna 3; in FIG. 6C, from highest group delay value at a frequency of 28 GHz to lowest group delay value at a frequency of 28 GHz are for antenna 1, antenna 3, antenna 2, and antenna 4; and in FIG. 6D, from highest group delay value at a frequency of 28 GHz to lowest group delay value at a frequency of 28 GHz are for antenna 2, antenna 4, antenna 3, and antenna 1.

FIG. 7A shows results for an azimuth angle (φ) of 0°, and FIG. 7B shows results for φ=90°. In FIG. 7A, the curve with the highest directivity value at θ=+45° is for beam 2, and the curve with the lowest directivity value at θ=+45° is for beam 1; and in FIG. 7B, the curve with the highest directivity value at θ=−45° is for beam 4, and the curve with the lowest directivity value at θ=−45° is for beam 3.

FIGS. 8A-8H show results for beams 1-8, respectively. In FIG. 8A, highest amplitude value at a frequency of 40 GHz to lowest amplitude value at a frequency of 40 GHz are for antennas 1, 3, 2, 5, 4, 6, 7, and 8. In FIG. 8B, highest amplitude value at a frequency of 40 GHz to lowest amplitude value at a frequency of 40 GHz are for antennas 1, 3, 5, 7, 2, 8, 4, and 6. In FIG. 8C, highest amplitude value at a frequency of 40 GHz to lowest amplitude value at a frequency of 40 GHz are for antennas 2, 4, 1, 6, 3, 8, 5, and 7. In FIG. 8D, highest amplitude value at a frequency of 40 GHz to lowest amplitude value at a frequency of 40 GHz are for antennas 2, 4, 6, 8, 1, 7, 5, and 3. In FIG. 8E, highest amplitude value at a frequency of 40 GHz to lowest amplitude value at a frequency of 40 GHz are for antennas 4, 6, 2, 8, 1, 3, 5, and 7. In FIG. 8F, highest amplitude value at a frequency of 40 GHz to lowest amplitude value at a frequency of 40 GHz are for antennas 1, 6, 4, 2, 8, 3, 5, and 7. In FIG. 8G, highest amplitude value at a frequency of 40 GHz to lowest amplitude value at a frequency of 40 GHz are for antennas 3, 5, 7, 1, 2, 8, 4, and 6. In FIG. 8H, highest amplitude value at a frequency of 40 GHz to lowest amplitude value at a frequency of 40 GHz are for antennas 3, 1, 5, 7, 4, 2, 6, and 8.

FIGS. 9A-9H show results for beams 1-8, respectively. In FIG. 9A, the grouping with the higher phase values are for P1-P3, P3-P5, and P5-P7 (referred to in this paragraph as "group 2") and the grouping with the lower phase values is for P1-P2, P3-P4, P5-P6, and P7-P8 (referred to in this paragraph as "group 1"). In FIG. 9B, the grouping with the higher phase values are for group 1 and the grouping with the lower phase values is for group 2. In FIG. 9C, the grouping with the higher phase values are for group 2 and the grouping with the lower phase values is for group 1. In FIG. 9D, the grouping with the higher phase values are for group 2 and the grouping with the lower phase values is for group 1. In FIG. 9E, the grouping with the higher phase values are for group 2 and the grouping with the lower phase values is for group 1. In FIG. 9F, the grouping with the higher phase values are for group 1 and the grouping with the lower phase values is for group 2. In FIG. 9G, the grouping with the higher phase values are for group 1 and the grouping with the lower phase values is for group 2. In FIG. 9H, the grouping with the higher phase values are for group 1 and the grouping with the lower phase values is for group 2. In each of FIGS. 9A-9H, the dotted black line is for the ideal case.

FIG. 11 shows a table with examples of excited beams pointing simultaneously at different angles, for the network shown in FIG. 3. In FIG. 11, $(\theta_o,\varphi_o)$ denotes each beam's direction, $f_o$ denotes the center frequency for each beam, BW denotes the bandwidth of the signal for each beam, and X denotes that the beam is not present.

DETAILED DESCRIPTION

Embodiments of the subject invention provide novel and advantageous ultrawideband (UWB) beamforming networks, as well as methods of fabricating the same and methods of using the same. A UWB beamforming network can have azimuth angle scanning and elevation angle scanning. A modified version of the Blass matrix topology can be used to achieve two-dimensional (2D) scanning behavior. The beamformer can simultaneously excite M number of beams (where M is an integer), and each of these beams can be at any chosen frequency inside the bandwidth ($BW_o$) that the beamformer covers. Each of the M beams can be designed to point at any arbitrary direction (which can be defined by the desired elevation angle (θ) and azimuth angle (φ) in the 2D plane, within the capabilities of the antenna array. The beamforming network, which can also be referred to herein as a beamformer, can provide true-time delay (TTD) performance.

While some related art beamforming network designs can provide 2D scanning, they are narrowband and bulky, typically using interconnected vertical and horizontal cards. Other related art beamforming network designs can provide UWB compact designs, but they cannot perform 2D scanning. Many related art beamforming network designs that provide UWB performance do not provide TTD performance, thereby suffering from beam-squinting.

Figure 1:
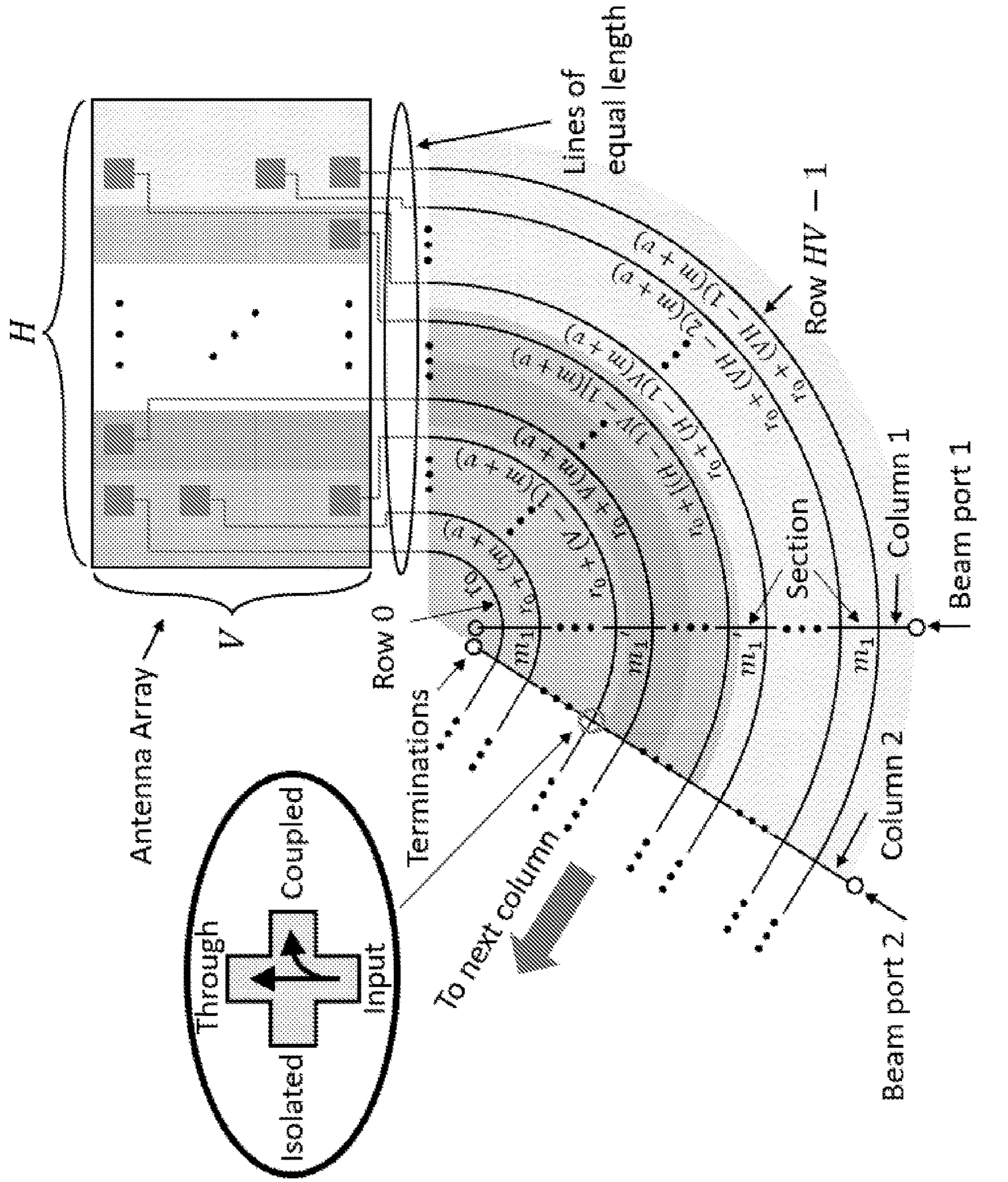
FIG. 1 shows a schematic view of a modified Blass matrix used in an ultrawideband (UWB) beamforming network, according to an embodiment of a subject invention.

Embodiments of the subject invention, on the other hand, provides UWB TTD beamforming performance, thereby eliminating beam-squinting, while also being able to scan in both the azimuth and elevation planes (2D scanning) while providing a planar design. In order to achieve 2D scanning behavior, a modified version of the Blass matrix topology can be used. The beamformer can be connected to a planar antenna array of H×V elements, as shown in FIG. 1, where H denotes the rows and V denotes the columns of the planar array. The beamformer can be assumed to cover a bandwidth, $BW_o$. The beamformer can include transmission lines (TLs) with directional couplers at their respective cross sections, as shown in the inset of FIG. 1. TL sections are noted in FIG. 1 with their corresponding delays. The directional couplers can be designed to cover the bandwidth ($BW_o$), and the TLs must operate in the desired bandwidth ($BW_o$), exhibiting acceptable dispersion characteristics. The planar antenna array can operate across the desired bandwidth ($BW_o$). Each column is divided into N−1=H×V−1 sections separated by the rows of the matrix. The electrical length of each section is adjusted independently of the other sections. There is a minimum electrical length (d_min) that a column should have and is necessary to account for the physical distance between the rows (to avoid coupling) and the electrical length of the couplers themselves. The rows of the matrix, along with the column sections between them, can be grouped into H number of blocks as shown in FIG. 1. Each block is responsible for feeding a sub-array column of V elements. The column sections, which belong in a single block, have electrical length m.

Figure 4:
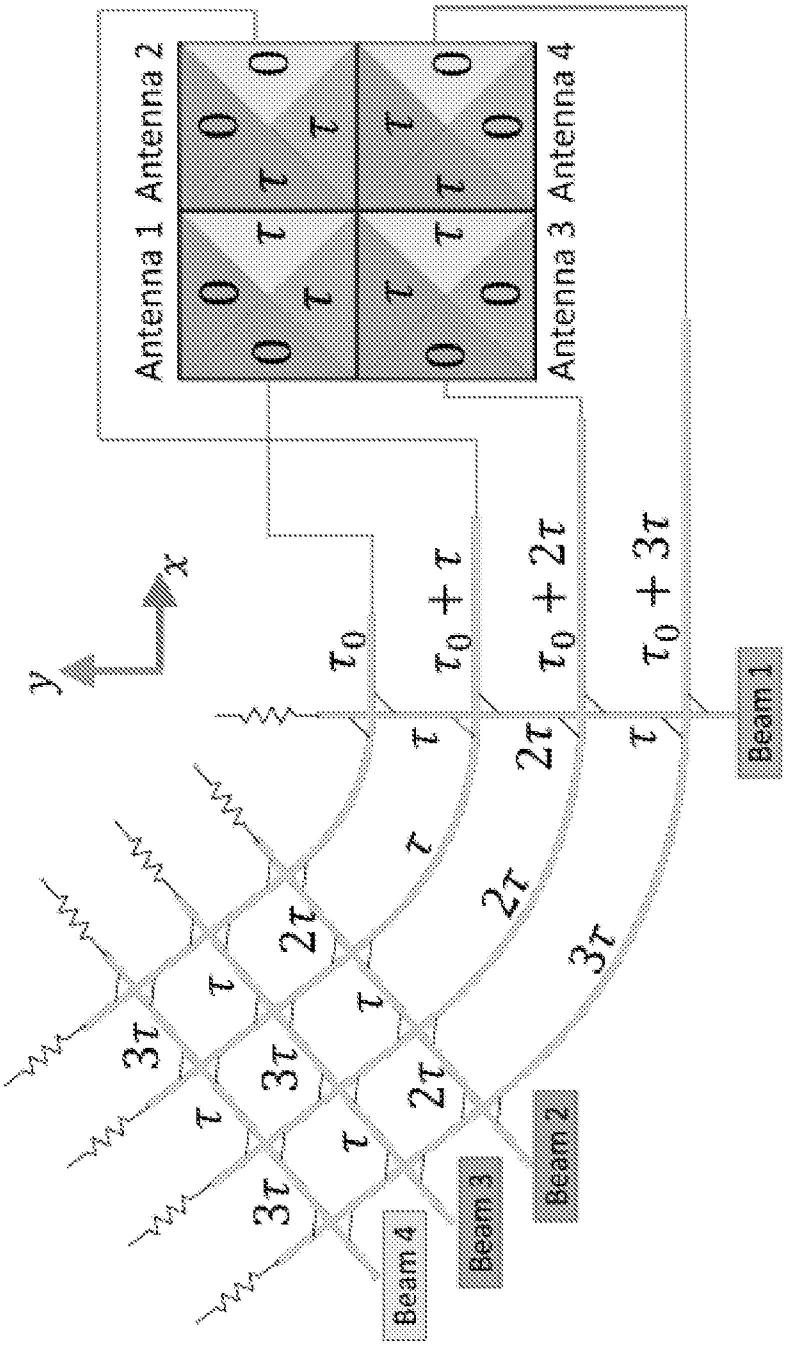
FIG. 4 shows a schematic view of a two-dimensional (2D) beamformer that can be used in a UWB beamforming network, according to an embodiment of a subject invention.

Embodiments of the subject invention take advantage of the versatility the Blass matrix offers in using TLs with any arbitrary length to obtain the desired complex weights at its output ports. Therefore, by appropriately designing the matrix, a design can be derived that can feed a planar array instead of the traditional linear array. FIG. 4 shows a network according to an embodiment of the subject invention. Referring to FIG. 4, the network can include cross-couplers, terminations, and delay-lines, and it can feed a planar array (e.g., a 2×2 planar array). Consider beam port 1; it is seen that the signal after traveling through successive couplings arrives at antennas 1-4 with relative delays of τ, τ, 0, and 0, respectively, steering the beam along the y-direction. Similarly, the other beam ports produce excitations of: 0, 0, τ, and τ for antennas 1-4, respectively (beam 2); 0, τ, 0, and T for antennas 1-4, respectively (beam 3); and τ, 0, τ, and 0 for antennas 1-4, respectively (beam 4). The concept can expand to larger matrices than 2×2, and there is no inherent restriction in the number of beam/antenna ports; they are decided (solely) based on the application requirements.

Figure 5:
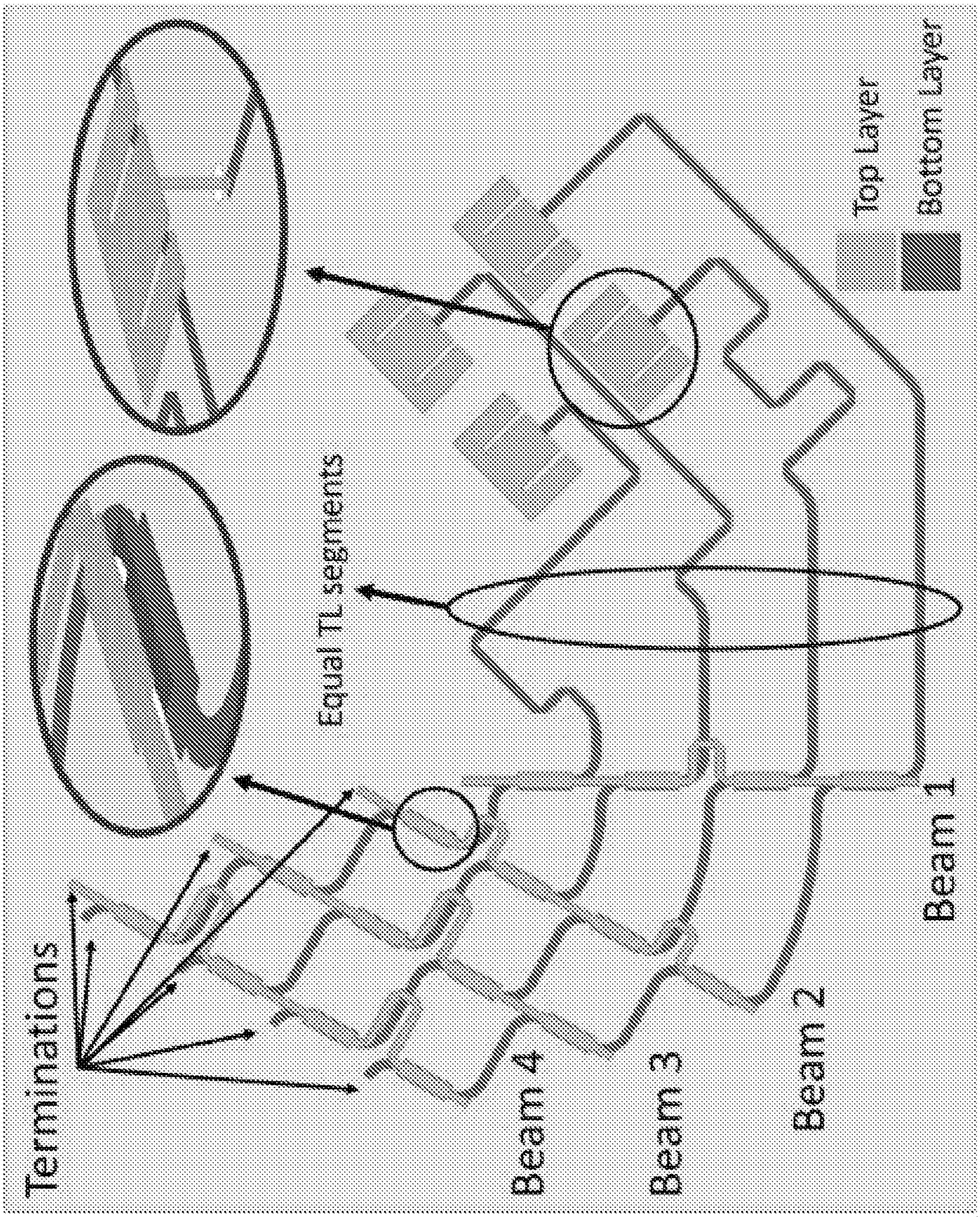
FIG. 5 shows a layout of a Blass matrix that can be used in a UWB beamforming network, according to an embodiment of a subject invention. A dual layer slot coupler and E-shaped patch antenna are shown in detail.
Figures 6A, 6B, 6C, 6D:
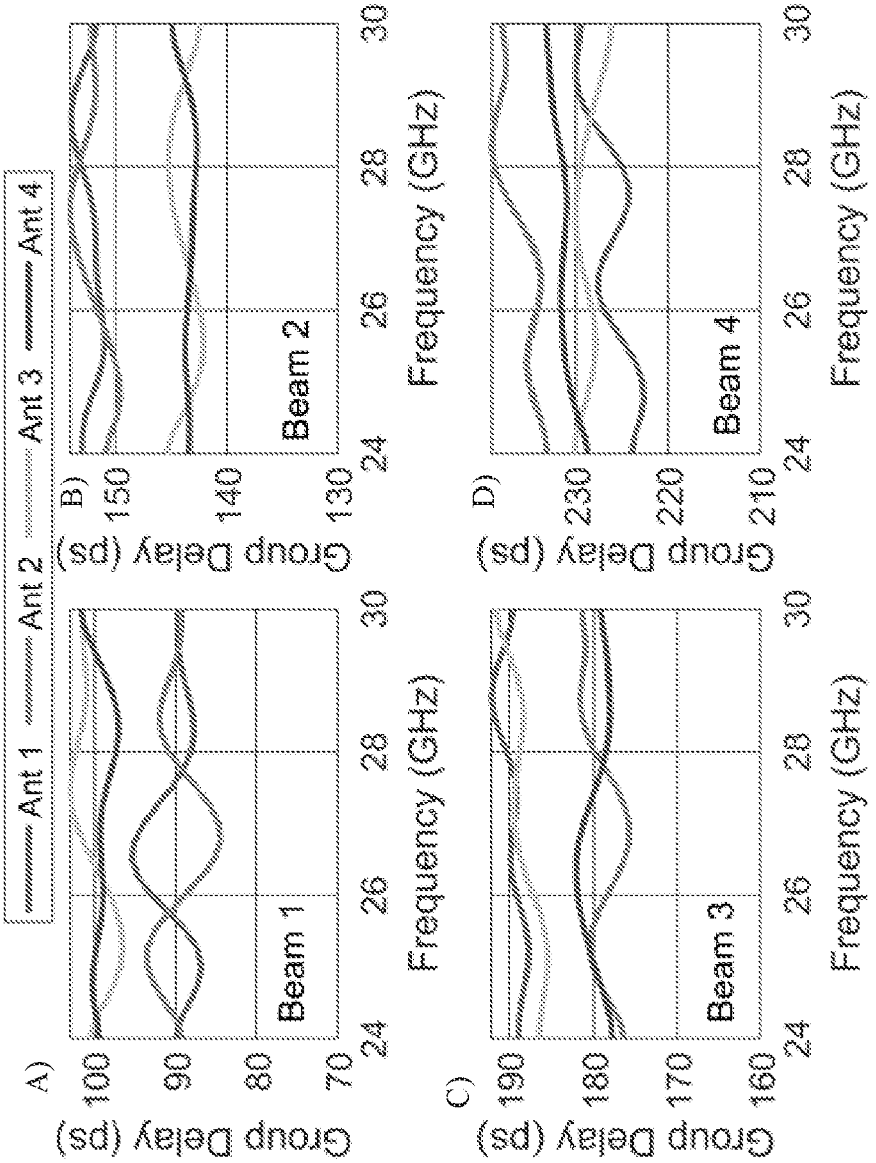
FIGS. 6A-6D show plots of group delay (in picoseconds (ps)) versus frequency (in gigahertz (GHz)), showing group delay response of a network.

As a cost effective and compact solution, the network can be designed on microstrip line technology (see FIG. 5). The cross couplers of the modified Blass matrix can be implemented as dual-layer slot couplers avoiding line crossings, and offering the required weak coupling (see also Lialios et al. 2020, Design of true time delay millimeter wave beamformers for 5g multibeam phased arrays, Electronics, vol. 9, no. 8, p. 1331, 2020; which is hereby incorporated by reference herein in its entirety). In addition, in order to preserve the desired time delays, and connect the planar array to the network, equal TL segments can be added at the outputs of the modified Blass matrix. E-shaped patch antennas can be used as radiating elements due to their excellent bandwidth characteristics. Notably, even though the Blass matrix can operate in multiple octaves, the operational bandwidth is restricted by the antennas. The beamforming network of embodiments of the subject invention can have a footprint of, for example, $4.5\lambda_0 \times 3.6\lambda_0$ (or less), where $\lambda_0$ is the free space wavelength of the network at the given frequency (e.g., 0.0125 meters evaluated at 24 GHz), with a thickness of no more than $\lambda_0/50$ (which corresponds to 0.254 millimeters at 24 GHz). This is much smaller than related art 2D beamformers, which occupy a volume of $14\lambda_0 \times 4\lambda_0 \times 4\lambda_0$.

There is a need in the art for beamforming networks that can operate in a wide bandwidth, are compact, and can steer their beams in the entire field of view. Embodiments of the subject invention address this need with a new class of planar beamforming networks, capable of steering their beams in both azimuth and elevation planes. While traditional planar Blass matrix topologies can only steer their beams in one plane, the modified planar Blass matrix topology (and the associated formulation) of embodiments of the subject invention can steer its beams in both principal planes (azimuth and elevation). This modified matrix topology is the first TTD planar multibeam network that can scan the entire field of view.

As an example, assume a planar array of H×V elements connected to the beamforming network, as shown in FIG. 1. Aiming for a TTD beamforming network capable of operating in a wide frequency range, the Blass matrix architecture can be used (see also Lialios et al. 2020, supra.). A Blass matrix can use TLs of any arbitrary length for obtaining the desired complex weights at its array ports. Here, it can be assumed that the modified Blass matrix of embodiments of the subject invention can excite M number of beams. FIG. 1 shows two columns of the Blass matrix that are connected to all the Blass's rows (radial transmission lines), and they feed all the H×V array elements to form a beam in a desired direction. The matrix includes TLs with directional couplers at their cross sections as shown in the inset of FIG. 1 and as discussed in detail above. The column sections that connect two blocks (sections that are shared between two areas connected to different sections of the antenna array) have an electrical length of m'=Vv+m+h, where h is the interelement delay across the array's rows (these are the required delays across the x direction in FIG. 1), and v is the interelement delay across the array's columns (these are the required delays across the y direction in FIG. 1). The rows have an electrical length corresponding to a time delay of $r_0$+r(m+v), where $r_0$ is a reference electrical length of row 0, since it cannot physically have zero electrical length, and r is the row number (starting from 0 to HV−1). All the antenna elements along the same row of the array are excited with a time delay difference h, whereas all the antenna elements along the same column of the array are excited with a time delay difference of v. This results in full azimuth and elevation scanning capabilities. By adding more columns to the network additional beams can be formed that point to any desired direction.

Embodiments of the subject invention provide beamformers with UWB TTD performance that can support next-generation millimeter (mm) Wave communication systems. Using these beamforming networks can provide more capabilities in the current and future terrestrial and satellite communications systems. Areas where embodiments of the subject invention can be advantageously used include but are not limited to multi-functional communications, UWB communications, terrestrial communication systems, satellite communication systems, mmWave communications, and communications in urban environments.

When ranges are used herein, such as for dose ranges, combinations and subcombinations of ranges (e.g., subranges within the disclosed range), specific embodiments therein are intended to be explicitly included. When the term "about" is used herein, in conjunction with a numerical value, it is understood that the value can be in a range of 95% of the value to 105% of the value, i.e. the value can be +/−5% of the stated value. For example, "about 1 kg" means from 0.95 kg to 1.05 kg.

A greater understanding of the embodiments of the subject invention and of their many advantages may be had from the following examples, given by way of illustration. The following examples are illustrative of some of the methods, applications, embodiments, and variants of the present invention. They are, of course, not to be considered as limiting the invention. Numerous changes and modifications can be made with respect to embodiments of the invention.

Example 1

Figure 7B:
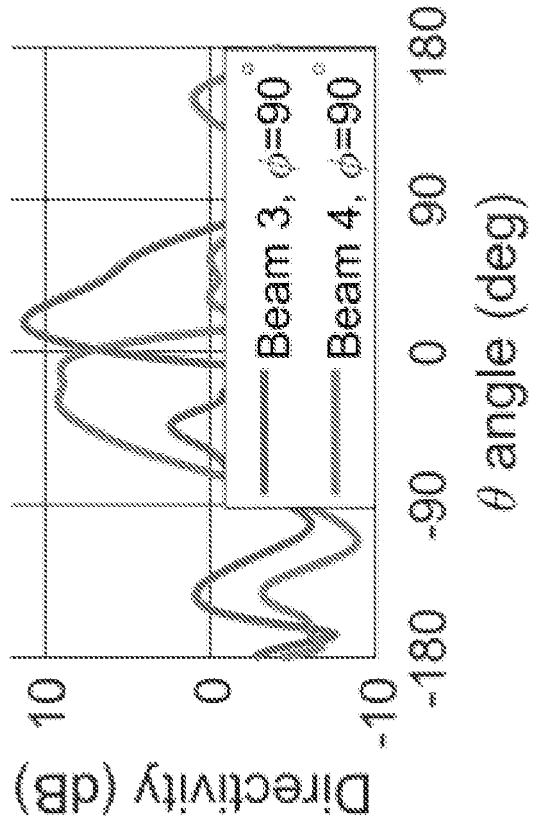
FIGS. 7A and 7B show plots of directivity (in decibels (dB)) versus elevation angle (θ) (in degrees) at a frequency of 24 GHz.
Figure 7A:
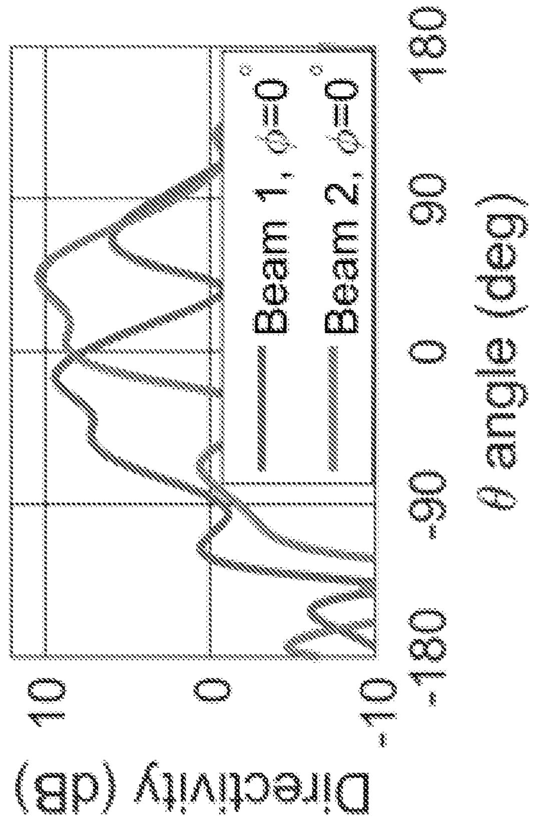
Figure 8A:
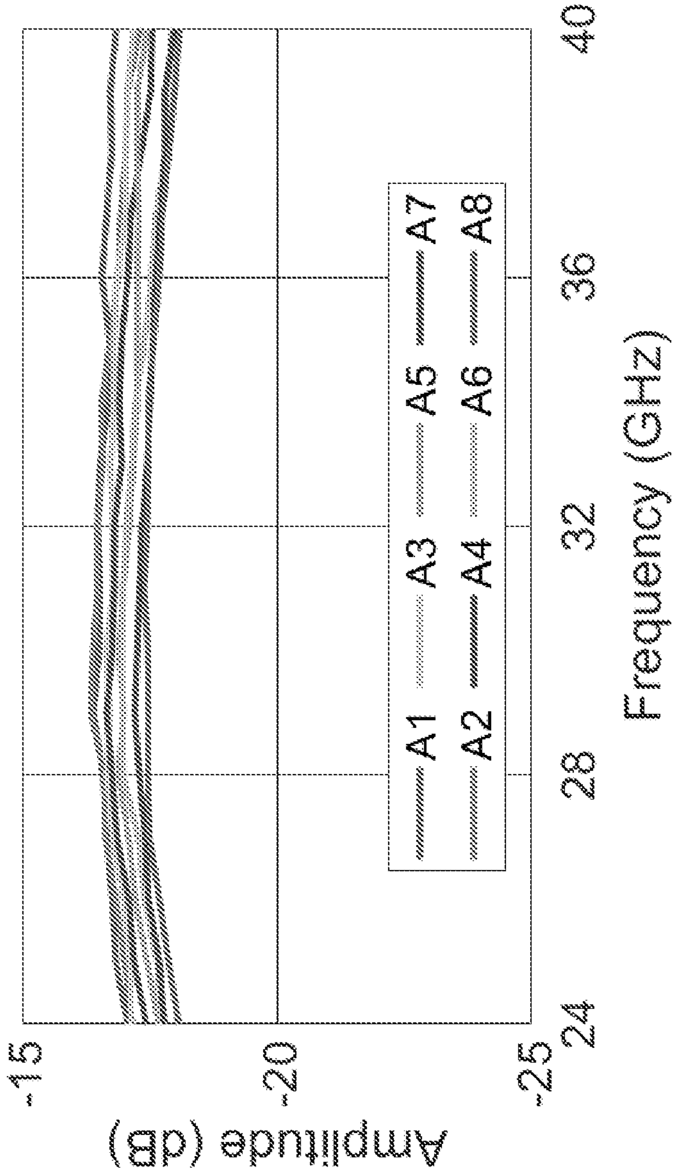
FIGS. 8A-8H show plots of amplitude (in dB) versus frequency (in GHz), showing analog beamformer response. Each plot shows amplitude of transmission coefficients from a given beam port to all antenna ports (antennas 1-8) for the network shown in FIG. 3.
Figure 8B:
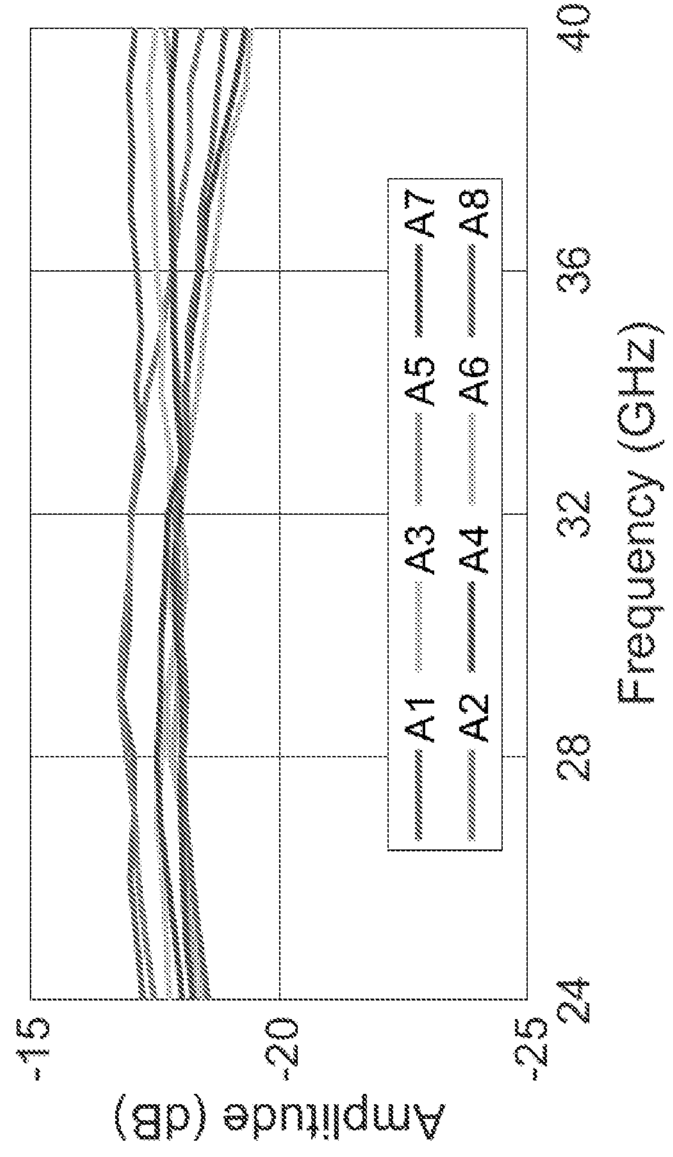
Figure 8C:
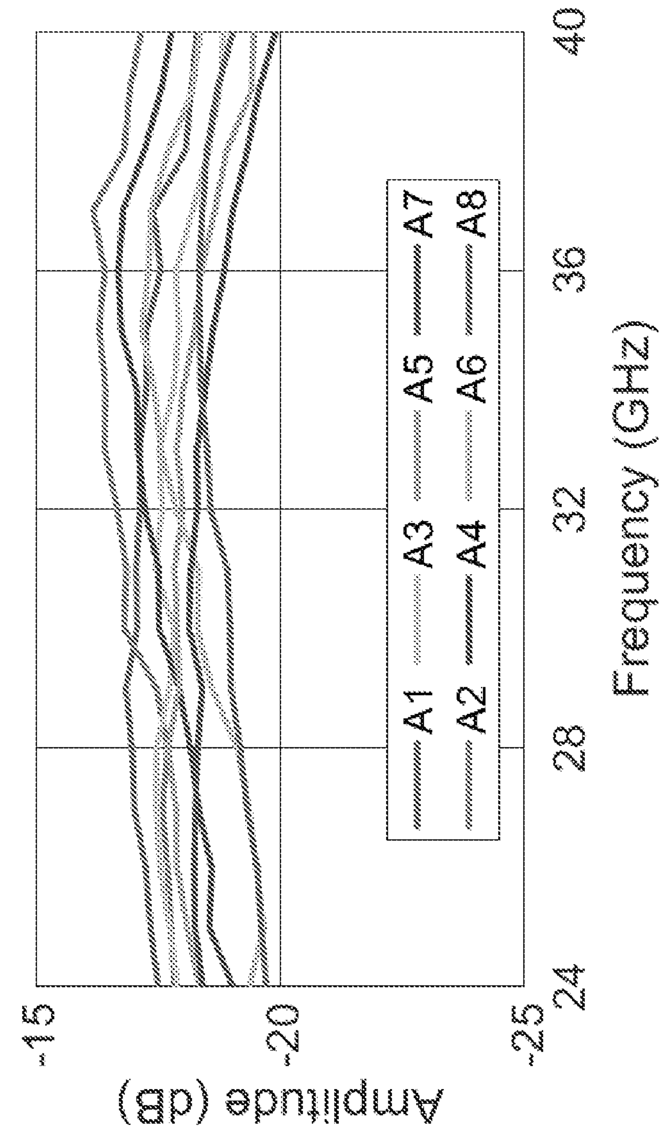
Figure 8D:
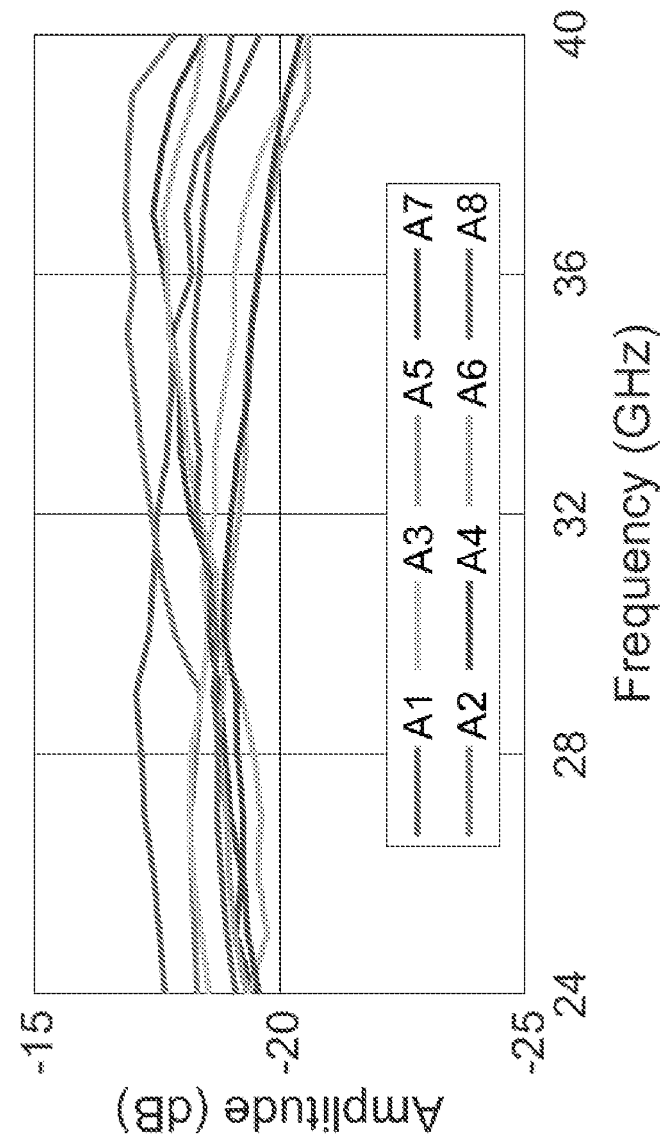
Figure 8E:
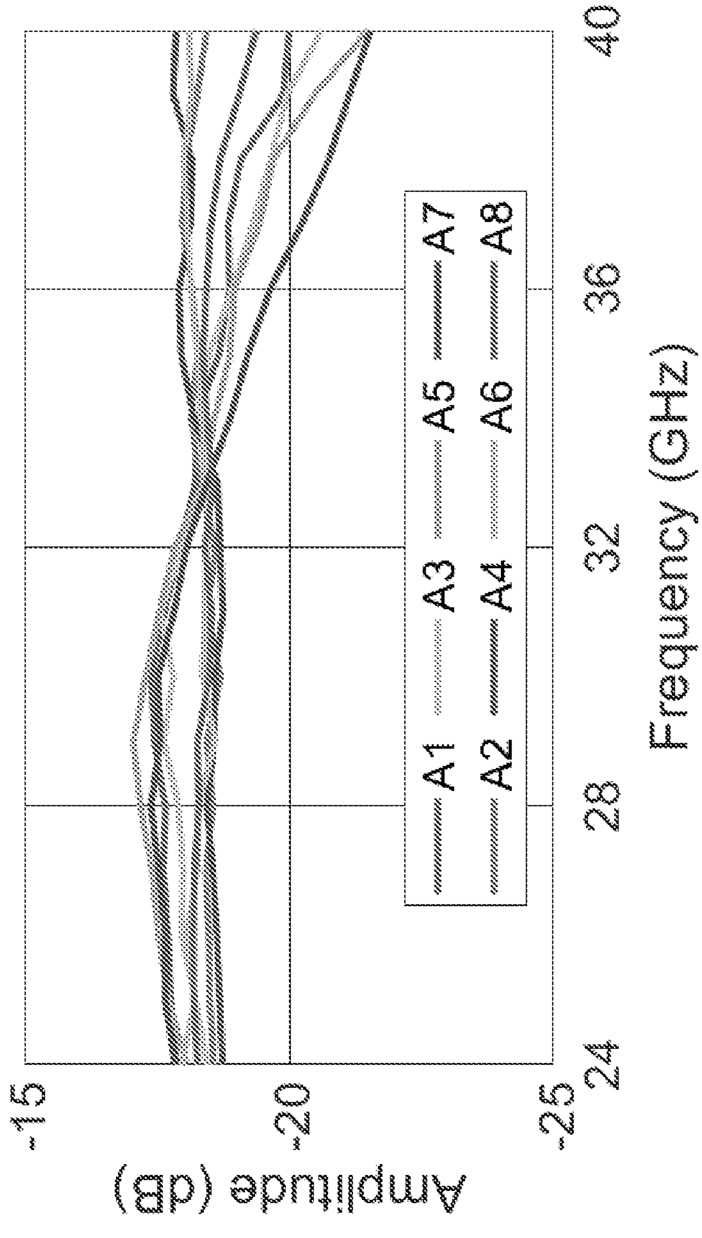
Figure 8F:
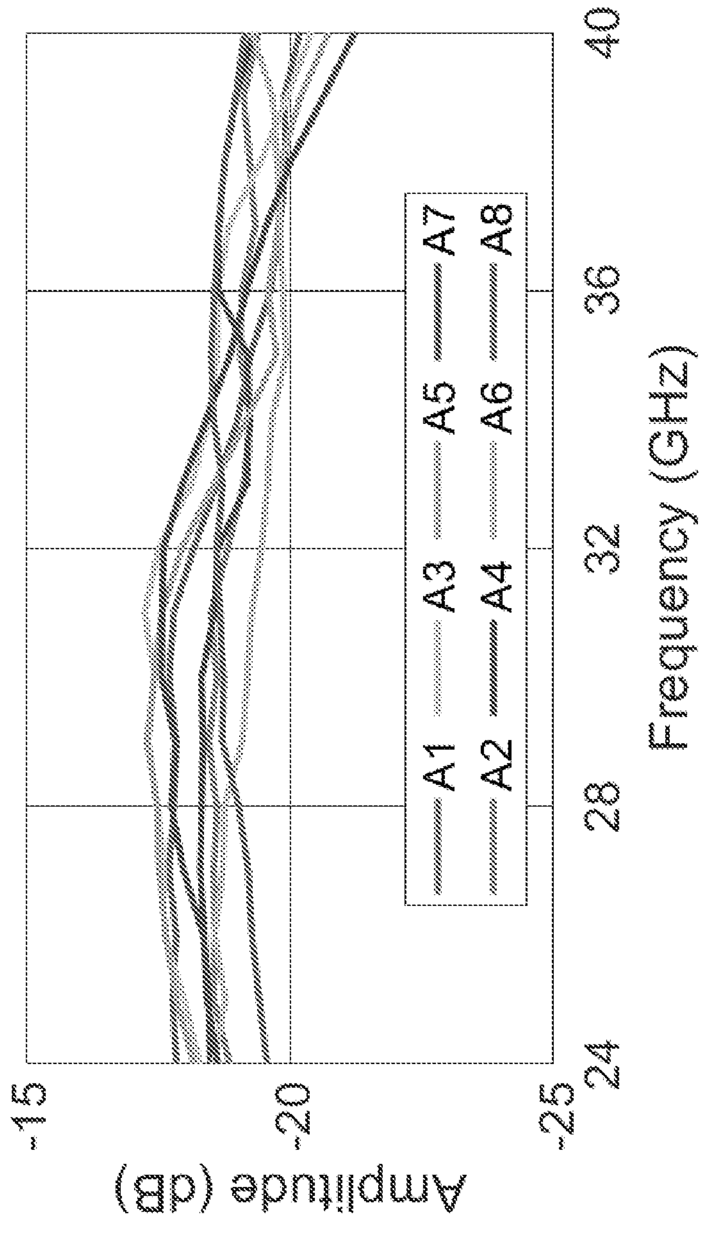
Figure 8G:
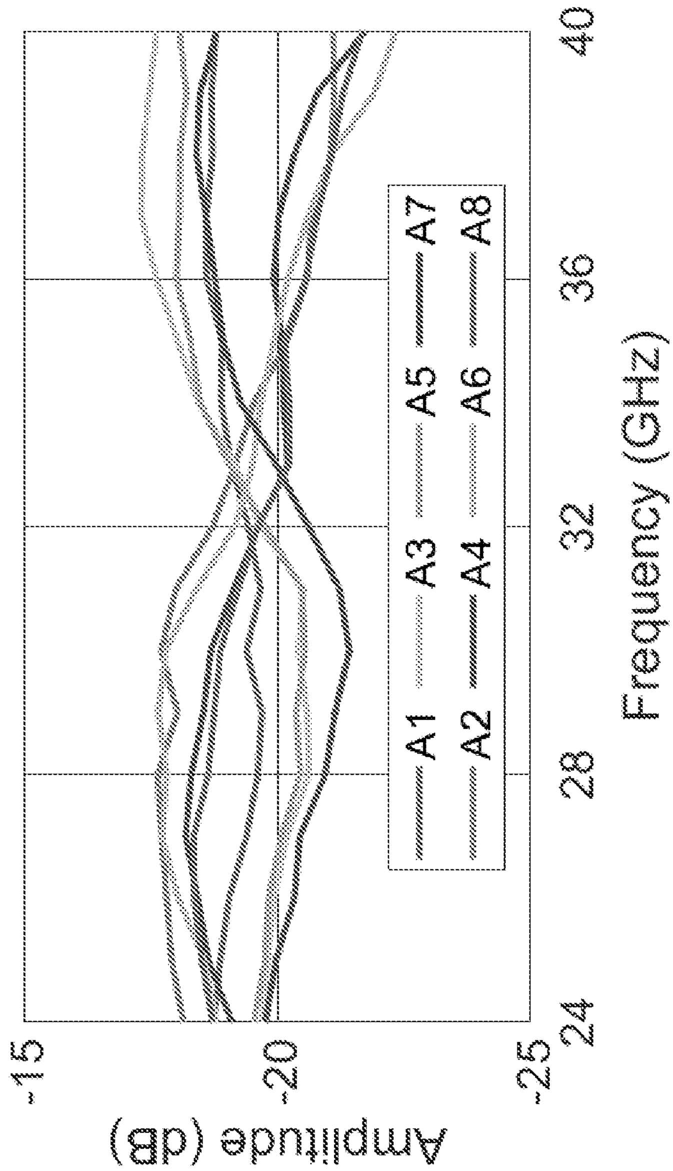
Figure 8H:
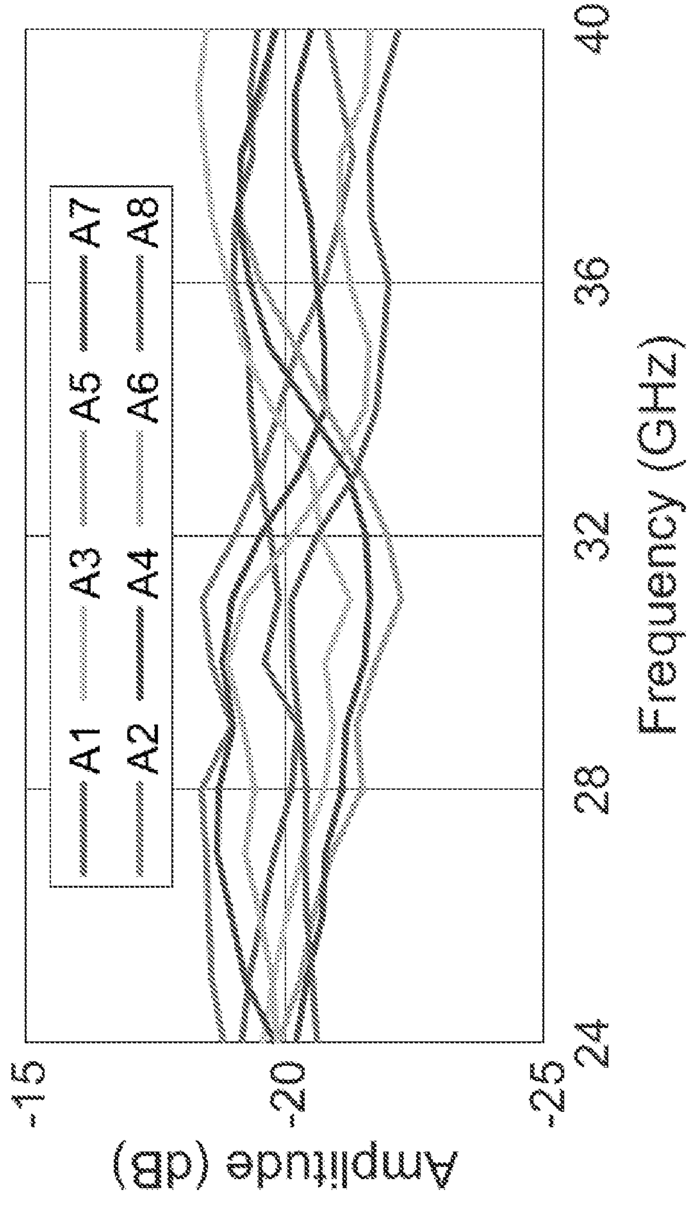
Figure 9A:
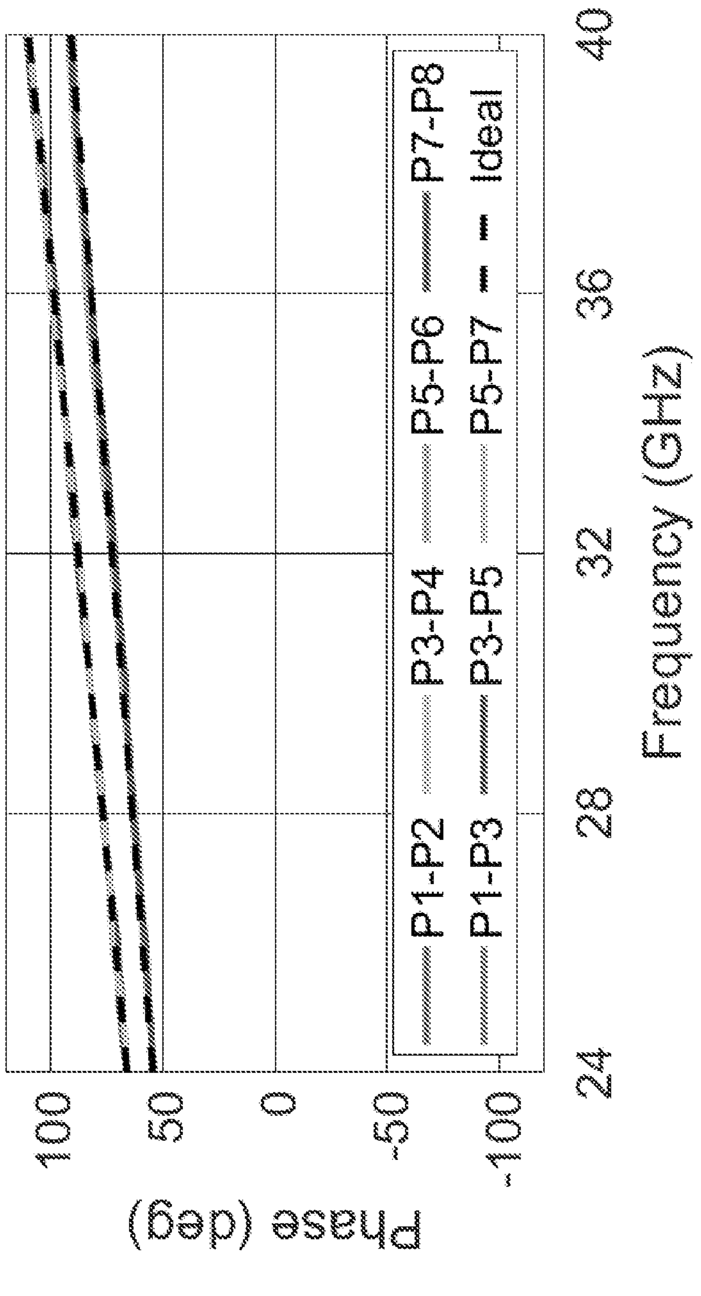
FIGS. 9A-9H show plots of phase (in degrees) versus frequency (in GHz), showing analog beamformer response. Each plot shows phase response from a given beam port to all antenna ports (antennas 1-8) for the network shown in FIG. 3.
Figure 9B:
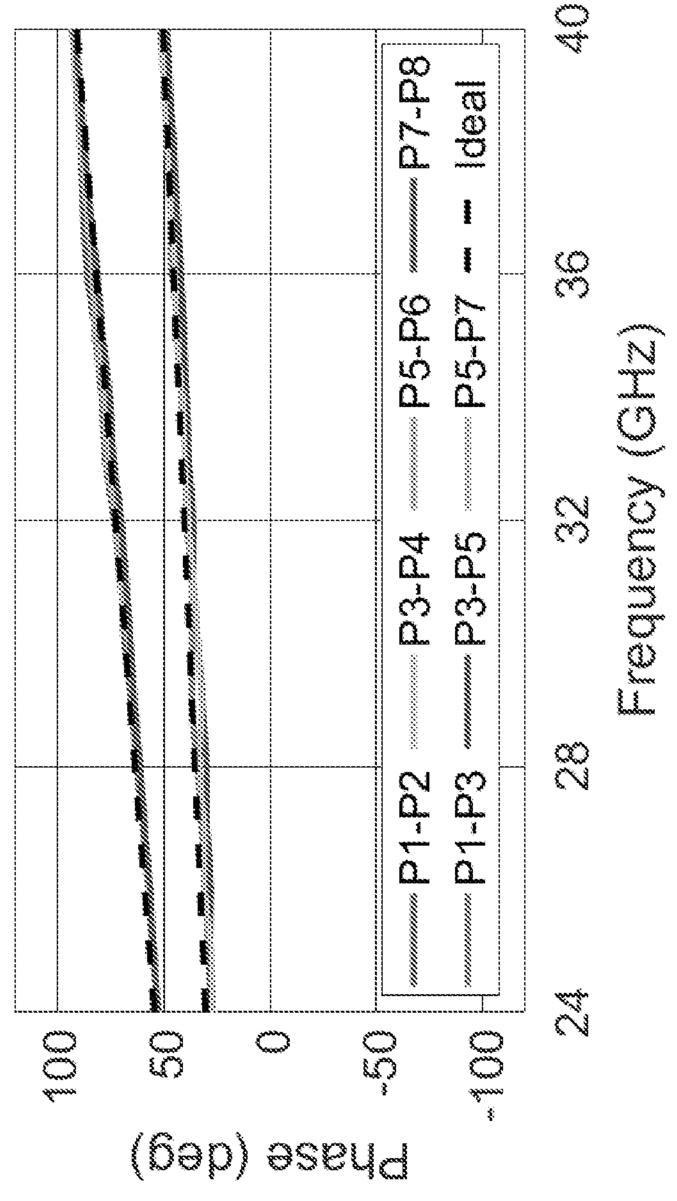
Figure 9C:
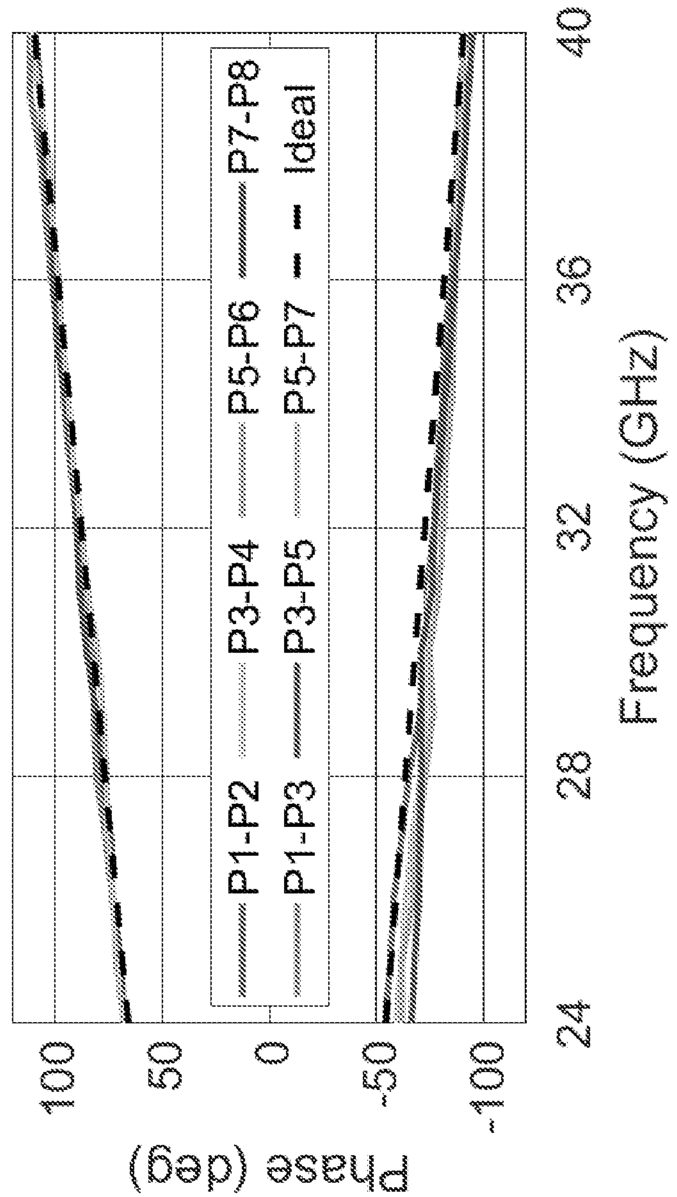
Figure 9D:
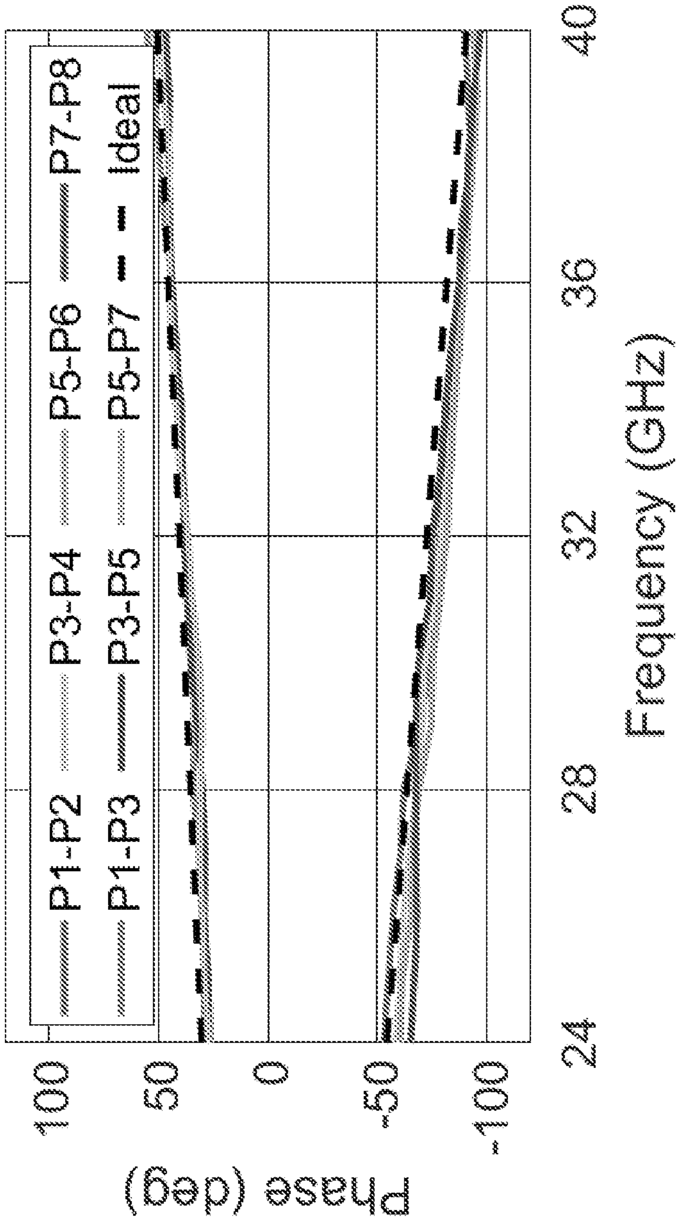
Figure 9E:
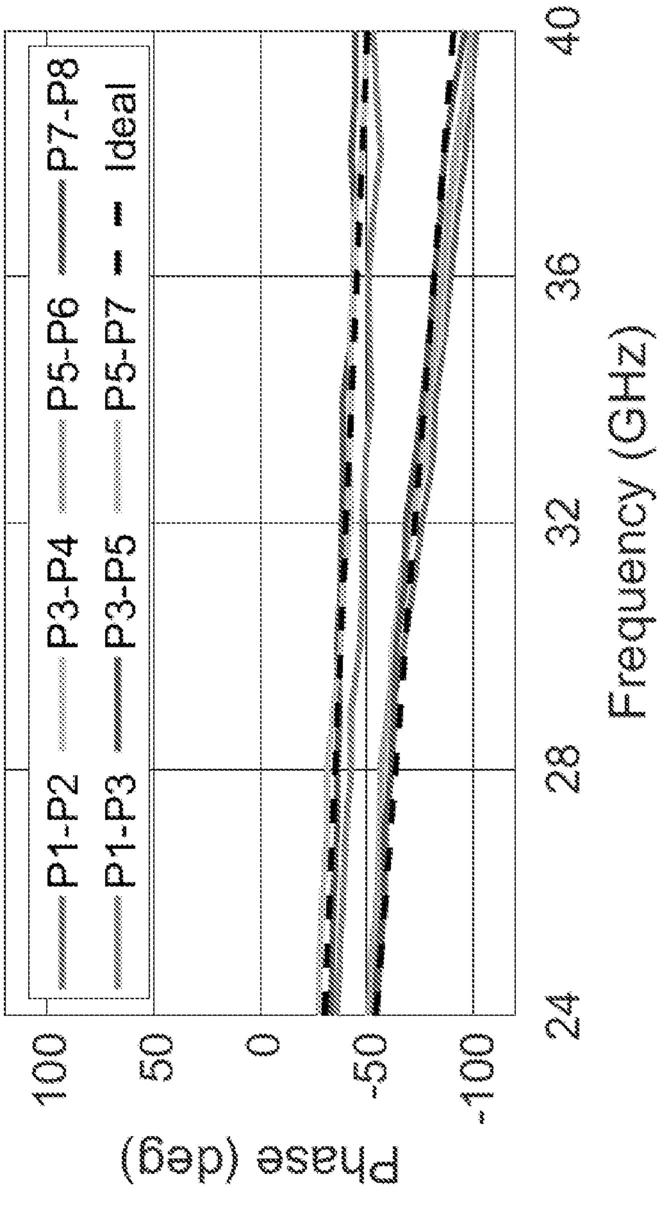
Figure 9F:
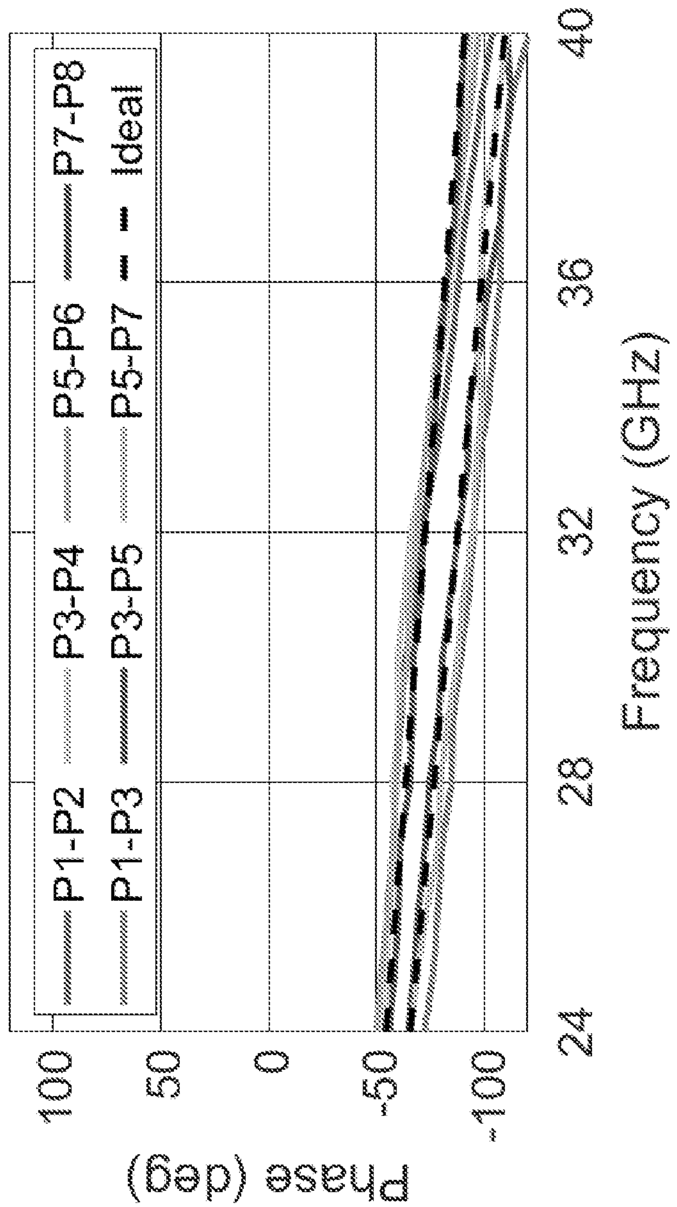
Figure 9G:
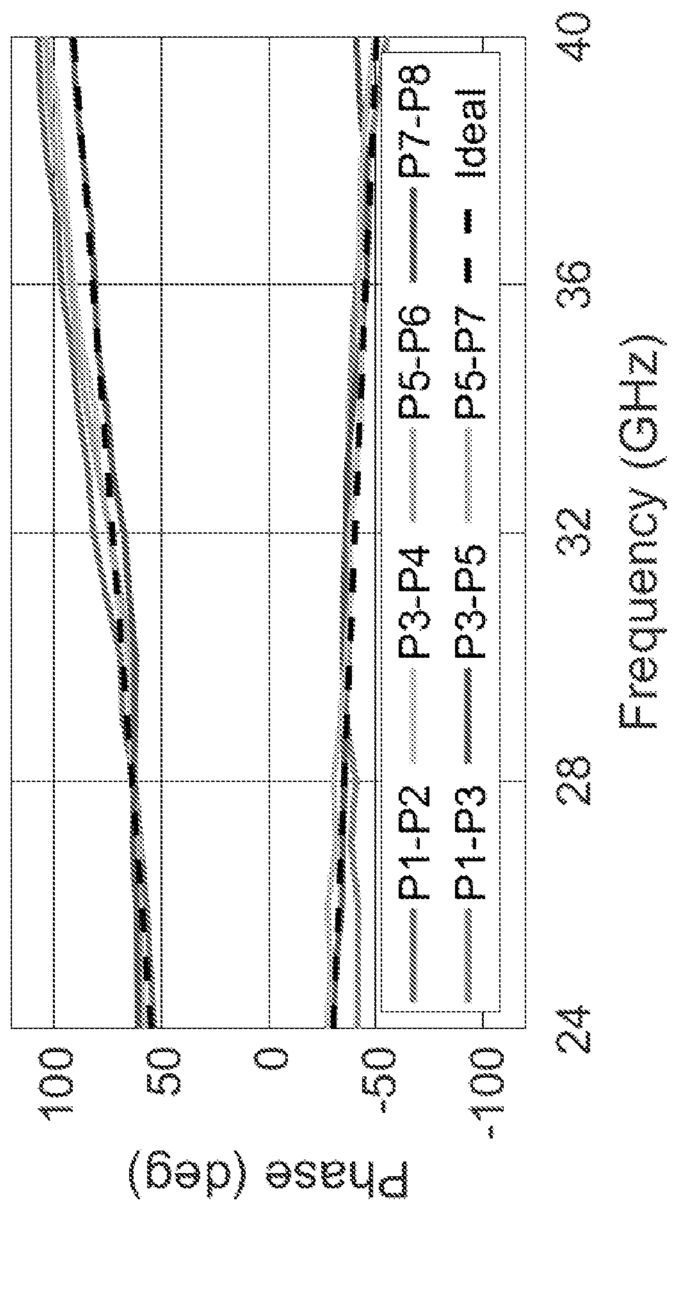
Figure 9H:
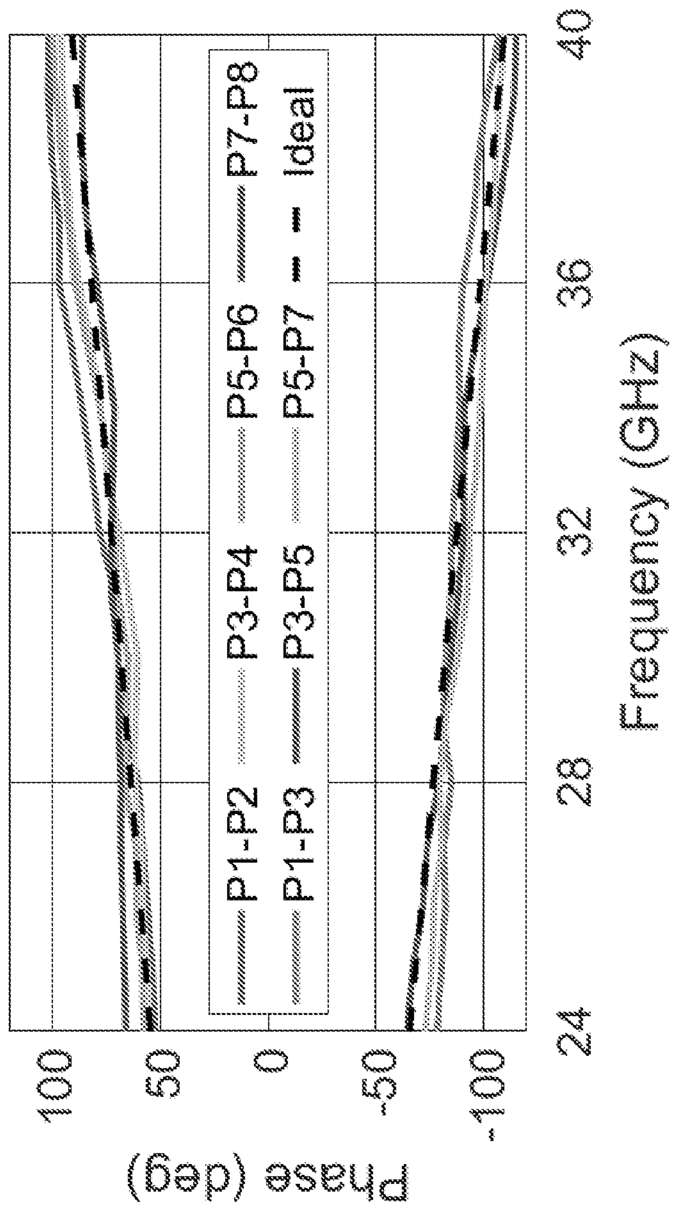

The modified Blass matrix shown in FIG. 5 was designed and simulated on ANSYS HFSS. The return loss was better than −15 decibels (dB) for all input ports over the operational bandwidth of 23 GHz-31 GHz. The group delays of these four excitations are shown in FIGS. 6A-6D, which are equal in pairs. Notably, for each case, the pairs differ by about $\Delta\tau$=11 ps, which is the desired time delay difference to steer the corresponding beams at the required directions. As an example, the radiation patterns for the frequency of 24 GHz are shown in FIGS. 7A and 7B, where elevation angle $\theta$ is scanned on the $\varphi$=0° and $\phi$=90° planes. The slight deviation obtained from the ideal direction of 30° is attributed to ripples stemming from the E-patch element factor.

Example 2

Figure 2A:
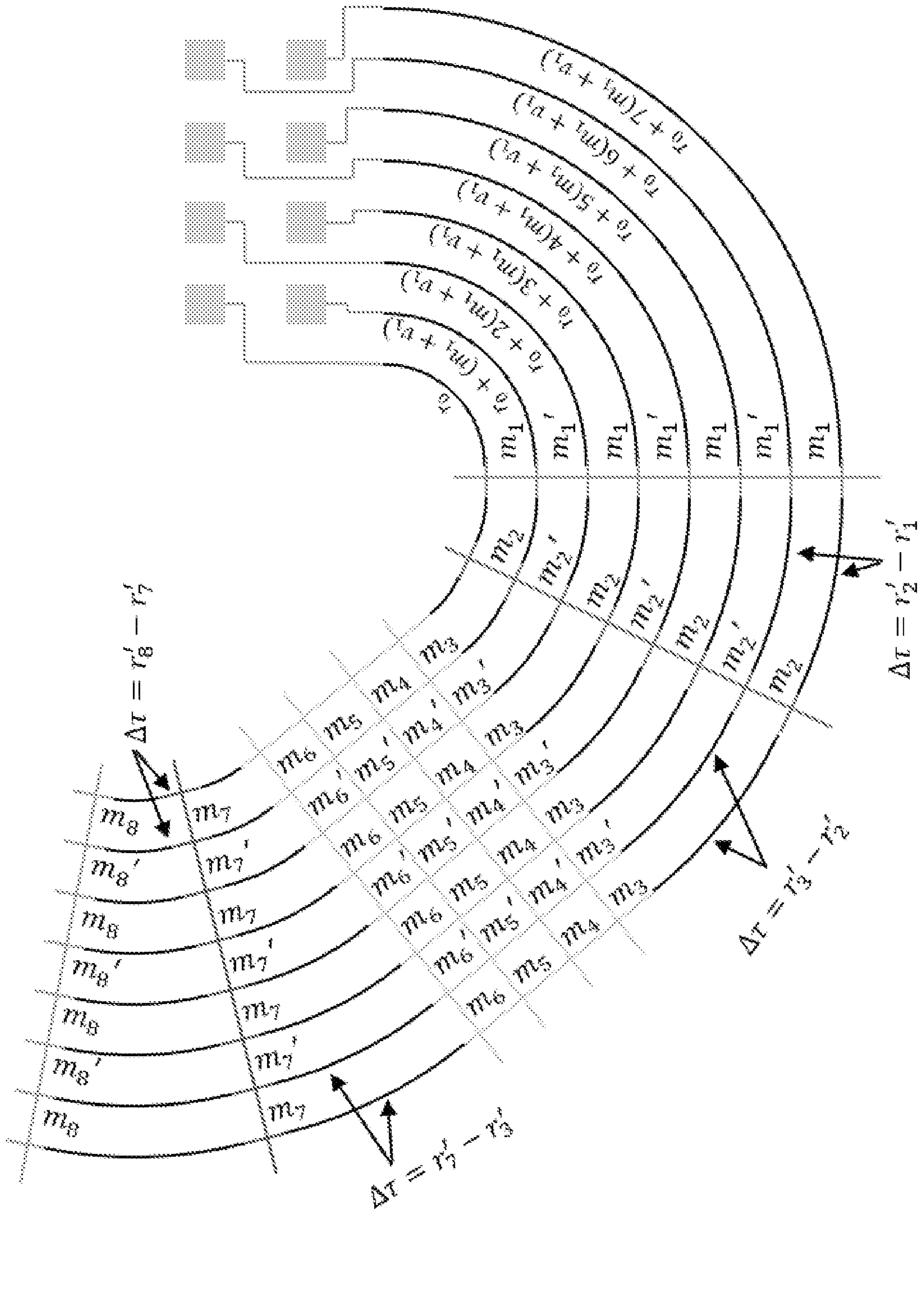
FIG. 2A shows a schematic view of an 8× (2×4) modified Blass matrix used in UWB beamforming network, according to an embodiment of a subject invention.
Figure 3:
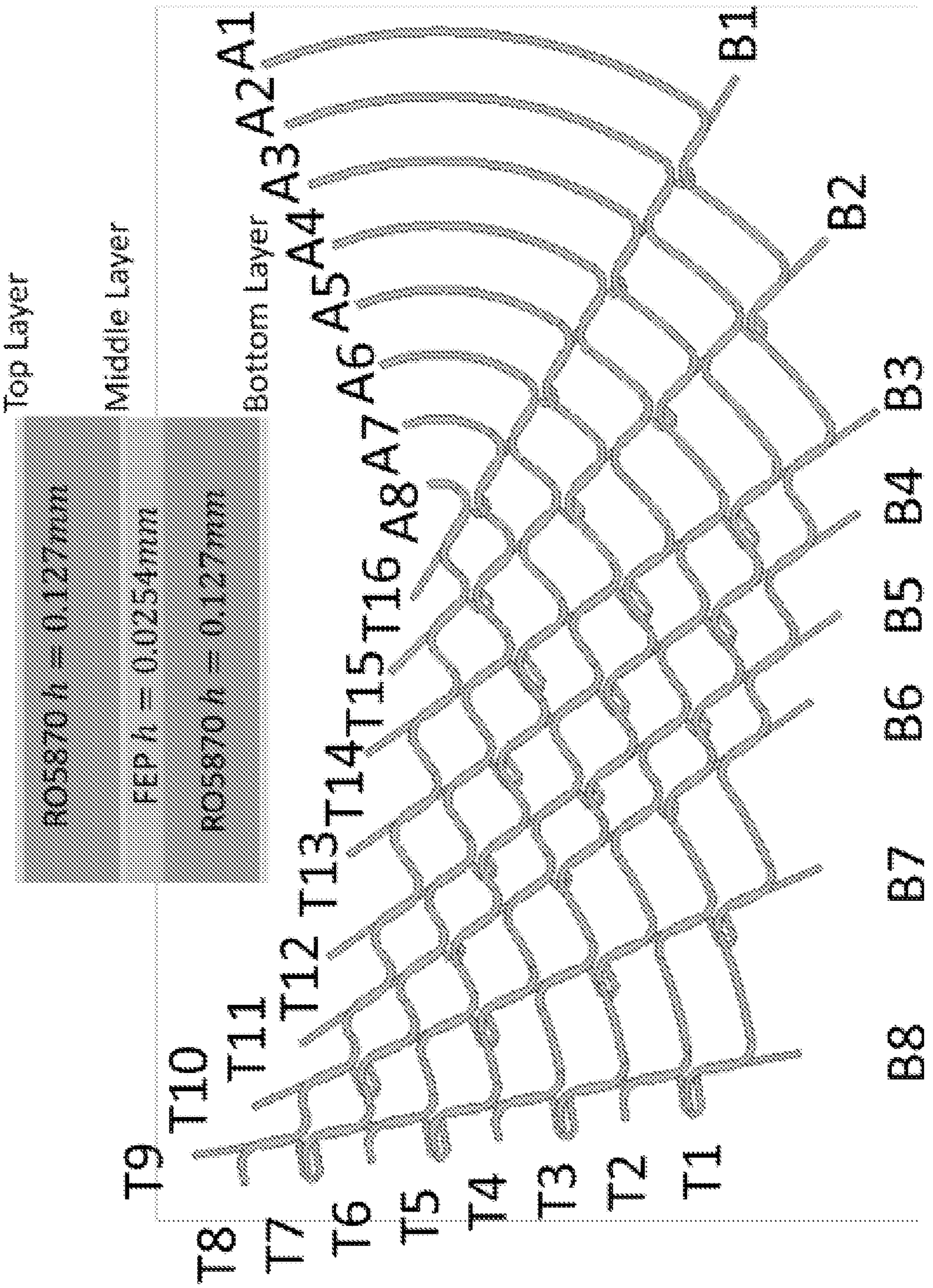
FIG. 3 shows a layout of an 8× (2×4) modified Blass matrix used in UWB beamforming network, according to an embodiment of a subject invention.

An 8-beam 4×2 antenna beamformer, as shown in FIGS. 2A and 3, was designed and simulated. The network was designed in dual-layer microstrip technology as shown in the inset of FIG. 3. Dual-layer slot couplers were utilized, similar to those in Lialios et al. 2022 (A novel RF to millimeter waves frequency translation scheme for ultra-wideband beamformers supporting the sub-6 GHz band, IEEE Transactions on Antennas and Propagation, vol. 70, no. 12, pp. 11 718-11 733, 2022; which is hereby incorporated by reference herein in its entirety), and meandered microstrip lines were used to implement the required time-delay. The beamformer was capable of exciting 8 beams. The table in FIG. 2B shows the chosen beam direction, as well as the design parameters. In FIG. 2A, $h_i$ is the interelement delay along the array rows, and vi is the interelement delay along the array columns.

Figure 10A:
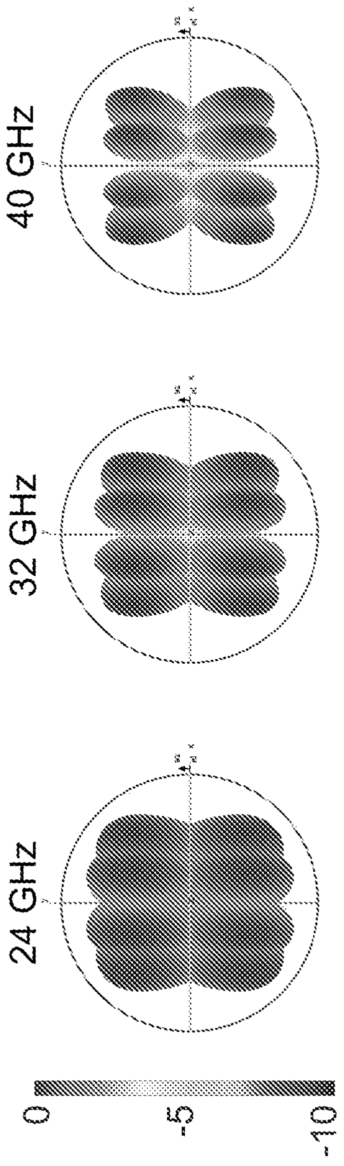
FIG. 10A shows an analytical array factor for the modified Blass matrix (shown in FIG. 2) at frequencies of 24 GHz, 32 GHz, and 40 GHz.
Figure 10B:
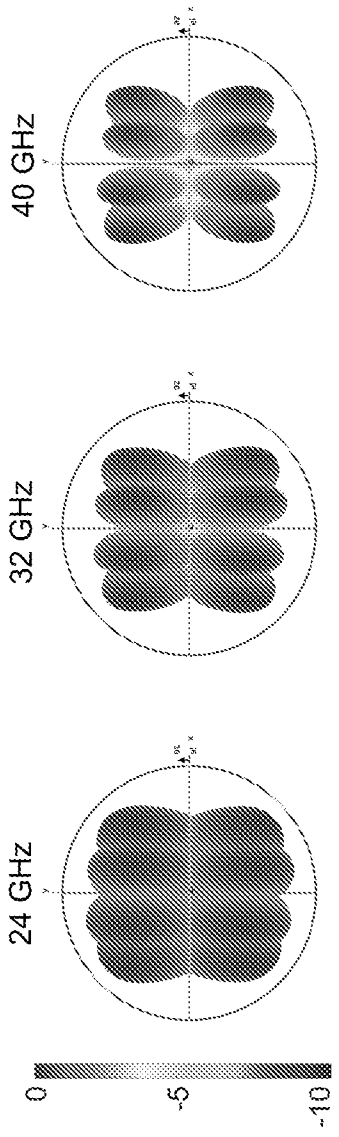
FIG. 10B shows a simulated array factor for the modified Blass matrix (shown in FIG. 2) at frequencies of 24 GHz, 32 GHz, and 40 GHz.

The design was simulated, and the responses were used to construct the array factor of an array with an inter element spacing along the two axes equal to d=3.75 millimeters (mm). The resulting array factors are depicted in FIG. 10B, with the calculated versions shown in FIG. 10A for comparison. These results show that 8 squint-free beams were produced, along both the azimuth and elevation planes, for the entire operational bandwidth of 24 GHz to 40 GHz.

The analog beamformer response was tested and measured. FIGS. 8A-8H show the amplitude of transmission coefficients from each beam port to all antenna ports, and FIGS. 9A-9H show the phase response from each beam port to all antenna ports.

The results validate that the beamformer can simultaneously excite eight beams and each of these beams can be at any chosen frequency inside the bandwidth (e.g., 24 GHz to 40 GHz) that the beamformer covers. The results further validate that the beamformer can be designed to point each of its eight beams towards any arbitrary direction (which can be defined by the desired elevation angle ($\theta$) and azimuth ($\varphi$) angle) in the 2D plane. Therefore, the beamformer can achieve 2D scanning in both azimuth and elevation planes. Each of the eight beams can simultaneously be at different frequencies from each other (i.e., all eight can be at different frequencies or any subset can be at the same frequency as each other and different from other beams). For example, depending on the needs of an application or a system, at one instance in time the beams (pointing at different directions) of the beamformer can be at the same frequency as each other and have the same bandwidth and at another instance the beams can be at different frequencies from each other and with different bandwidth. The bandwidth of the signal for each beam can be up to the operational bandwidth of the beamformer. The table in FIG. 11 shows some representative case examples.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein are incorporated by reference in their entirety, including all figures and tables, to the extent they are not inconsistent with the explicit teachings of this specification.

What is claimed is:

1. An ultrawideband (UWB) beamforming network, comprising: a modified Blass matrix topology comprising a plurality of beams, a plurality of transmission lines (TLs), a plurality of intersections of TLs of the plurality of TLs, and a plurality of directional couplers respectively disposed at each intersection of TLs, the UWB beamforming network having an operational bandwidth, each directional coupler of the plurality of directional couplers being configured to cover the operational bandwidth of the UWB beamforming network, the UWB beamforming network being configured such that each beam of the plurality of beams operates at a respective frequency within the operational bandwidth of the UWB beamforming network, and the UWB beamforming network being configured such that each beam of the plurality of beams is capable of being directed at any elevation angle and any azimuth angle.

2. The UWB beamforming network according to claim 1, the UWB beamforming network being configured to provide true-time delay (TTD) performance.

3. The UWB beamforming network according to claim 1, the modified Blass matrix topology further comprising a plurality of beam ports, a plurality of antenna ports, and a plurality of termination ports.

4. The UWB beamforming network according to claim 3, a quantity of the termination ports being at least two times a quantity of the beam ports.

5. The UWB beamforming network according to claim 1, each directional coupler of the plurality of directional couplers being a dual-layer slot coupler.

6. The UWB beamforming network according to claim 1, the UWB beamforming network having a footprint of no more than $4.5\lambda_0 \times 3.6\lambda_0$, where $\lambda_0$ is the free space wavelength of the UWB beamforming network.

7. The UWB beamforming network according to claim 1, the operational bandwidth of the UWB beamforming network being from 24 gigahertz (GHz) to 31 GHz.

8. The UWB beamforming network according to claim 1, the operational bandwidth of the UWB beamforming network being from 24 GHz to 40 GHz.

9. The UWB beamforming network according to claim 1, the UWB beamforming network being configured such that each beam of the plurality of beams is capable of being at a different frequency from each other beam of the plurality of beams.

10. The UWB beamforming network according to claim 1, the plurality of beams comprising at least eight beams.

11. A communications system, comprising: an antenna array; and an ultrawideband (UWB) beamforming network connected to the antenna array, the UWB beamforming network comprising a modified Blass matrix topology comprising a plurality of beams, a plurality of transmission lines (TLs), a plurality of intersections of TLs of the plurality of TLs, and a plurality of directional couplers respectively disposed at each intersection of TLs, the UWB beamforming network having an operational bandwidth, each directional coupler of the plurality of directional couplers being configured to cover the operational bandwidth of the UWB beamforming network, the UWB beamforming network being configured such that each beam of the plurality of beams operates at a respective frequency within the operational bandwidth of the UWB beamforming network, and the UWB beamforming network being configured such that each beam of the plurality of beams is capable of being directed at any elevation angle and any azimuth angle.

12. The communications system according to claim 11, the antenna array comprising a plurality of E-shaped patch antennas.

13. The communications system according to claim 11, the UWB beamforming network being configured to provide true-time delay (TTD) performance.

14. The communications system according to claim 11, the modified Blass matrix topology further comprising a plurality of beam ports, a plurality of antenna ports, and a plurality of termination ports each antenna port of the plurality of antenna ports being connected to an antenna of the antenna array.

15. The communications system according to claim 14, a quantity of the termination ports being at least two times a quantity of the beam ports.

16. The communications system according to claim 11, each directional coupler of the plurality of directional couplers being a dual-layer slot coupler.

17. The communications system according to claim 11, the UWB beamforming network having a footprint of no more than $4.5\lambda_0 \times 3.6\lambda_0$, where $\lambda_0$ is the free space wavelength of the UWB beamforming network.

18. The communications system according to claim 11, the operational bandwidth of the UWB beamforming network being from 24 gigahertz (GHz) to 40 GHz.

19. An ultrawideband (UWB) beamforming network, comprising: a modified Blass matrix topology comprising a plurality of beams, a plurality of transmission lines (TLs), a plurality of intersections of TLs of the plurality of TLs, and a plurality of directional couplers respectively disposed at each intersection of TLs, the UWB beamforming network having an operational bandwidth, each directional coupler of the plurality of directional couplers being configured to cover the operational bandwidth of the UWB beamforming network, the UWB beamforming network being configured such that each beam of the plurality of beams operates at a respective frequency within the operational bandwidth of the UWB beamforming network, and the UWB beamforming network being configured such that each beam of the plurality of beams is capable of being directed at any elevation angle and any azimuth angle, the UWB beamforming network being configured to provide true-time delay (TTD) performance, the modified Blass matrix topology further comprising a plurality of beam ports, a plurality of antenna ports, and a plurality of termination ports, each directional coupler of the plurality of directional couplers being a dual-layer slot coupler, the UWB beamforming network having a footprint of no more than $4.5\lambda_0 \times 3.6\lambda_o$ where $\lambda_0$ is the free space wavelength of the UWB beamforming network, the operational bandwidth of the UWB beamforming network being from 24 gigahertz (GHz) to 40 GHz, the UWB beamforming network being configured such that each beam of the plurality of beams is capable of being at a different frequency from each other beam of the plurality of beams, and the plurality of beams comprising at least eight beams.

20. A communications system, comprising:

an antenna array; and the UWB beamforming network according to claim 19 connected to the antenna array, the antenna array comprising a plurality of E-shaped patch antennas, and the plurality of antenna ports being respectively connected to the plurality of E-shaped patch antennas.

* * * * *